June 3, 1930. A. PFAU 1,761,797
METHOD OF AND MEANS FOR CONTROLLING PRIME MOVER DYNAMO PLANTS
Original Filed Sept. 11, 1924
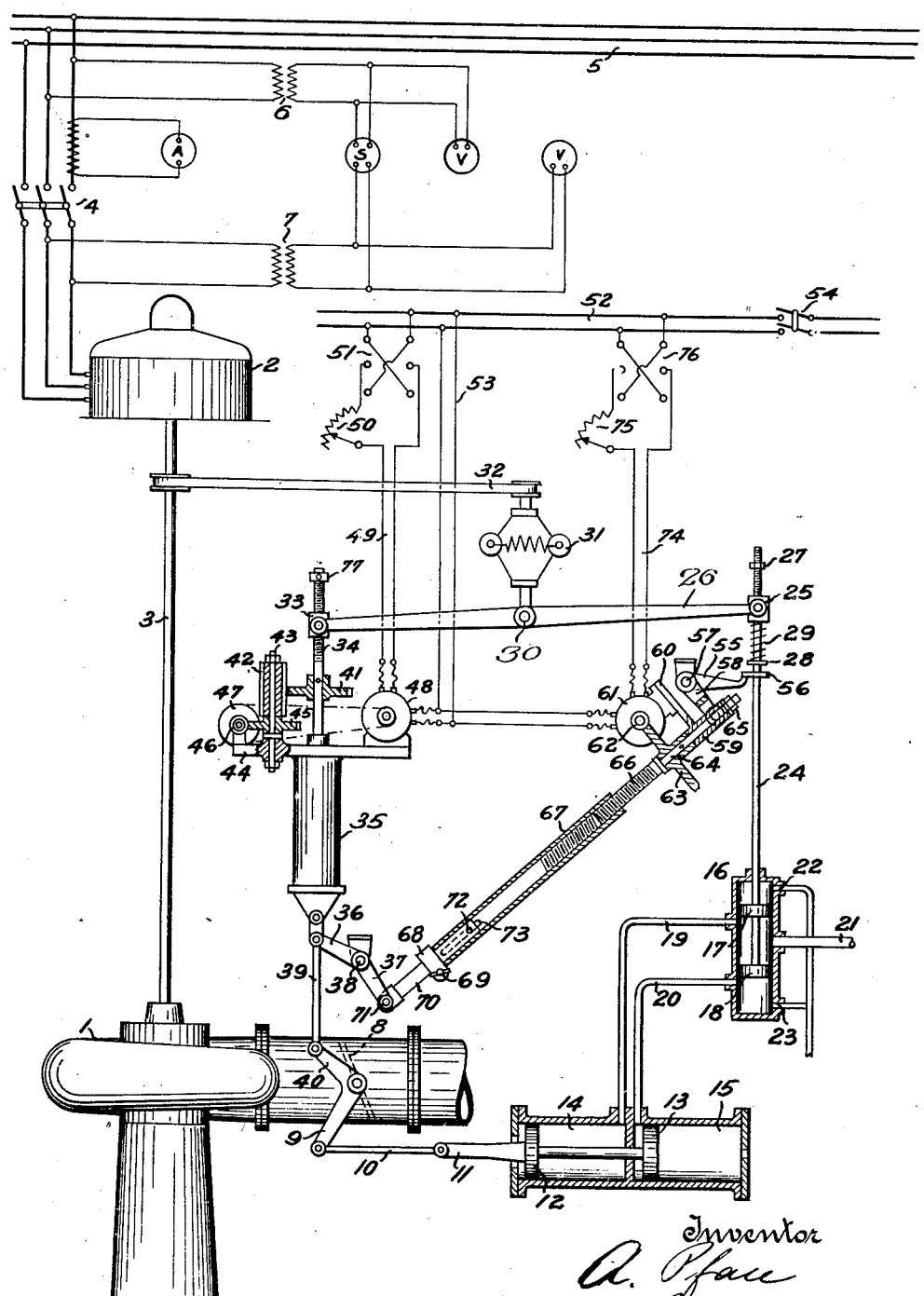

Patented June 3, 1930

1,761,797

UNITED STATES PATENT OFFICE

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

METHOD OF AND MEANS FOR CONTROLLING PRIME-MOVER DYNAMO PLANTS

Original application filed September 11, 1924, Serial No. 737,021. Divided and this application filed January 14, 1928. Serial No. 246,663.

This invention relates to a method of and means for controlling a prime mover driving a dynamo electric machine. The invention relates more particularly to installations where the prime mover drives an alternating current generator and where it is desired to synchronize the generator and bring it into phase with the line to which it is to be connected.

The broader aspects of the invention irrespective of the nature of the device driven by the prime mover are claimed in applicant's copending application S. N. 737,021, filed September 11, 1924, of which the present application is a division.

Under certain conditions it is difficult to bring a prime mover to synchronous speed with the line to which the generator driven by the prime mover is to be connected. A certain amount of fly wheel effect is generally desirable for the reason that if the prime mover is controlled by means of a governor and started in the usual manner it may occur that the governor will hunt at friction load. The governor may hunt to such an extent that the speed cannot be held steady enough to permit the generator to be thrown in parallel with the line. The hunting may be so severe that the means for admitting operating fluid to the prime mover may actually alternately open and close. Complicated pipe line conditions, where the prime mover is, for example, a hydraulic turbine, may also cause hunting when it is attempted to start the turbine under the control of the governor. These conditions may be remedied to some extent by the provision of sufficient fly wheel effect but this is an expensive procedure.

It is an object of this invention to provide a method and means whereby the hereinbefore mentioned difficulties may be overcome; and more specifically whereby hunting of the governor during the starting and synchronizing operation will be prevented irrespective of the amount of fly wheel effect; and whereby prime mover and generator units providing only a very small fly wheel effect not sufficient to enable the unit to be started in the ordinary manner under the control of its governor without prohibitive hunting may be built and successfully started and synchronized under the control of a governor.

Still another object is the provision of a method and means for controlling a prime mover so that the power which may be supplied thereby may be limited to a predetermined amount and whereby the load on the system supplied by the prime mover must fall to a predetermined amount before the power supplied by said prime mover will be decreased, and whereby the said limits may be adjusted from a distant point.

A further object is the provision of a system in which a prime mover driving an alternating current generator adapted to supply a distribution system may be started from rest and brought to synchronous speed with said system, the generator connected, and caused to assume a load under the control of a governor, and in which all these operations may be controlled by a single operator. More specifically, to this end it is an object to provide a system which includes remotely controllable means for positively predetermining the maximum opening of the means for admitting operating fluid to the prime mover whereby the said opening may be gradually permitted to increase as desired. Also, so that the prime mover may be caused, from a distant point, to take a load, and the power furnished by said prime mover may at all times be limited as desired.

Other objects will appear hereinafter as the description of the invention proceeds.

The novel features of this invention will appear from this specification and the accompanying drawing which forms a part thereof and shows one embodiment of said invention and all these novel features are intended to be pointed out in the claim.

The single figure of the drawing is a more or less diagrammatic showing of the invention as it may be applied in connection with a hydraulic turbine driving an alternating current generator and controlled by a governor.

Referring to the drawing, the hydraulic turbine 1 is adapted to drive a generator 2 through a shaft 3. The generator 2 may be connected by means of any suitable switch 4 which may of course be electromagnetically operated if desired, to a distribution system or line 5 here shown as of the three-phase type.

In order that the switch 4 may be closed when the generator 2 is running synchronously with the system 5 and is in phase therewith and at the same voltage, various instruments may be provided such as the synchroscope S and the volt meters V. The synchroscope is here shown as fed by two potential transformers 6, 7 connected respectively to be influenced by the distribution system 5 and by the generator 2. One of the volt meters is connected to transformer 6 to indicate line voltage and the other to transformer 7 to indicate generator voltage. In order that the amount of current delivered by generator 2 to line 5 may be indicated an ammeter A may be provided. Watt meters (not shown) may of course also be provided. All of these instruments including the switch 4 are preferably mounted within the operating scope of a single operator. If the switch 4 is remotely controlled, only the master control switch therefor need of course be mounted near the other instruments.

The turbine 1 is here shown as controlled by means of a gate 8 disposed in the conduit adapted to admit water to the turbine. It is of course to be understood that any other means for controlling the admission of operating fluid to the turbine may be provided, such as for example, the usual guide vanes. The gate 8 may be swung by means of a crank 9 connected through a rod 10 to the piston rod 11 of any suitable form of servo-motor. The servo-motor is here shown as including a pair of pistons 12, 13 operating in cylinders 14, 15 respectively. The servo-motor may be controlled by means of a regulating valve 16 here shown as including piston valves 17, 18 which are so spaced that they are respectively adapted to cover the ports of a pair of pipes 19, 20. The pipes 19, 20 lead from the cylinder of valve 16 to cylinders 14, 15 respectively. The regulating valve is also provided with an inlet pipe 21 through which fluid under pressure may be admitted under the control of the regulating valve to the servo-motor. The regulating valve is also provided with a pair of drain pipes 22, 23.

The pistons 17, 18 of the regulating valve may be mounted on and operated by means of a rod or stem 24 the upper end of which passes freely through a swivel nut 25 pivotally mounted on a floating lever 26. The end of rod 24 is threaded to receive an adjustable nut 27 against which the swivel nut 25 is adapted to abut. The rod 24 is provided with a collar 28 between which and the swivel nut 25 is disposed a spring 29 for a purpose to be hereinafter set forth.

The floating lever 26 is provided with a floating pivot 30 the position of which may be controlled by means of fly balls 31 made responsive to the speed of shaft 3 as, for example, by means of a driving connection including a belt 32. The other end of the floating lever 26 is provided with a swivel nut 33 through which one end of a piston rod 34, provided at the upper end with a stop collar 77, is adapted to screw. The piston rod 34 is associated with a piston and dash pot of a compensating device 35 of any usual or desired form. The dash pot of the compensating device may be raised and lowered by means of a bell crank 36, 37 swingable about a pivot 38. The arm 36 of the bell crank is connected by means of a link 39 to a crank 40 operating in unison with the crank 9 or gate 8. The piston rod 34 is here shown as provided with a gear 41 adapted to be driven by a pinion 42 rotatable about a shaft 43. The shaft 43 may be fixed in any suitable manner to a bracket 44 mounted on the dash pot 35. A worm wheel 45 is provided for driving the pinion 42 and said worm wheel is operable by means of a worm 46 driven in any suitable manner by a motor 48 as through a belt and pulley 47. The motor 48 is here shown as mounted on the bracket 44. The armature of motor 48 is fed through leads 49 connectible to buses 52 through a reversing switch 51. The speed of motor 48 may be controlled by means of a rheostat 50. The field of motor 48 is fed from buses 52 through leads 53.

The governor may be robbed of its control of the regulating valve 16, to an extent hereinafter set forth, by means of a control finger 55 swingable about a pivot 57. The control finger 55 is, in the instance shown, adapted when swung in a counter-clockwise direction, to engage a projection 56 associated in any suitable manner and at any desired point with the rod 24. The control finger 55 may be swung by means of a lever 58 operating in unison therewith and forked at one end to receive a swivel nut 59. A motor 61 is here shown as mounted on the swivel nut 59 as by means of a bracket 60. The motor 61 is adapted, through a worm 62 connected therewith, to drive a worm wheel 63 keyed to a shaft 64 freely rotatable in the swivel nut 59. The shaft 64 is held in the swivel nut 59 by means of a nut 65 on the upper threaded end of shaft 64. Operatively associated with shaft 64 or forming a part thereof is a threaded spindle 66 adapted to screw in or out of the threaded pipe 67. The lower end of pipe 67 is adapted to slide over a rod 70 and in the position shown abuts against a clamp 68 fastened, by means of the adjusting screw 69, to the rod 70. The abutment constituted by the clamp 68 is made adjustable so that the position of the control finger 55 may be adjusted irrespective of the relative positions of spindle 66 and pipe 67. This adjustability is however not necessarily essential. The rod 70 is pivoted at 71 to the arm 37 of bell crank 36, 37. In order to prevent turning of pipe 67 with respect to rod 70, the rod 70 may be provided with a pin 72 engaging in a slot 73 formed in the pipe 67.

The armature of motor 61 is fed through lead 74 from buses 52 through a reversing switch 76. The speed of the motor 61 may be controlled by a rheostat 75. The field of motor 61 is here shown as also fed through leads 53. It is to be understood that the particular form of the motors 48, 61 is not material. These motors might, for example, be of the split field reversing type and controlled in the manner customary with such motors. The motors 48, 61 may, if desired be provided with limit switches to prevent them from over-running, or mechanical stops may be provided for the same purpose in which case slip clutches or connections are desirable. In the instance shown, the belt connecting motor 48 with pulley 47 will serve as a slip connection. The motor 61 may, if desired, be similarly connected to the worm 62. It is to be understood that the connections between the motors 48, 61 and their driven members are merely by way of illustration.

The reversing switches 51, 76 and the rheostats 50, 75, or other controlling means for the motors 48, 61 are preferably located near the controlling means for switch 4 and the other instruments such as the synchroscope, etc.

If desired the position of the spindle 66 of the control finger 55 may be indicated at a distant point, preferably at the location of the other control instruments hereinbefore described. The same is true as to the position of the nut 33. Inasmuch as indicating means for the purpose of showing the position of members at a distant point are old and well known in the art none has been shown on the drawing.

The operation of the system is as follows. The parts are shown in the drawing in the positions which they occupy when the turbine 1 is at rest, the gate 8 being closed. The nut 33 is preferably positioned so that when the turbine and generator have been brought to synchronous speed with the line 5 and the generator connected, the generator will either float on the line or will deliver a predetermined amount of power thereto when the governor is free to act. If now the operator desires to start the unit he closes the switch 54 and closes the reversing switch 76 in the proper direction so that the motor 61 will rotate in such a direction as to screw the spindle 66 into the tube 67 thereby causing the control finger 55 to move in a clockwise direction at a speed dependent upon the adjustment of rheostat 75. The projection 56 on the stem 24 will follow the control finger 55 by reason of the expansion of the spring 29. When control finger 55 has moved in a clockwise direction a predetermined amount the regulating valve 16 will have been permitted to move, under the influence of spring 29, to a position in which the port of pipe 19 will be closed and that of pipe 20 will be open. Fluid under pressure will therefore be admitted through the regulating valve to cylinder 15 thereby moving the gate 8 toward open position. Movement of gate 8 toward gate open position is relayed to control finger 55 by link 39 swinging bell crank 36, 37 in a counter-clockwise direction thereby causing rod 70, by means of clamp 68, to push spindle 66 and therefore control finger 55 in a counter-clockwise direction. This will cause movement of the regulating valve toward its neutral position in which both of the ports 19, 20 are closed thereby immediately stopping further admission of fluid to cylinder 15 and further gate opening movement. It will be evident that the clockwise movement of finger 55 caused by motor 61 and the relay movement caused by the opening of the gate 8 will take place substantially simultaneously so that the resultant effect will be the opening of gate 8 at a predetermined rate under the positive control of the finger 55. In other words, it is impossible for the regulating valve 16 to act to cause opening of gate 8 to an amount greater than that predetermined by the position of control finger 55 at any given instant. When the turbine has reached a speed synchronous with that of the line 5 the nut 27 and the swivel nut 25 will be fairly close to each other or in contact, depending upon the adjustment of the nut 33. Further increase in speed, if it occurs, would cause the fly balls 31 to lift the floating lever 26 swinging the same about the pivot of nut 33 thereby lifting the regulating valve stem 24 to the gate-closed position and admitting fluid to cylinder 14. As soon as gate 8 begins to move toward closed position, however, this motion is relayed through the compensating device 35 raising the end 33 of the floating lever and immediately bringing the regulating valve back to its neutral position. Some motion of control finger 55 in a clockwise direction occurs simultaneously. If the amount of movement of gate 8 toward closed position has been more than necessary this will be reflected in a drop in speed and consequent movement of the floating lever to move the valve 16 toward gate-open position. Any movement of the gate, however, toward open position will cause the control finger to return the valve 16 to neutral position and the gate-movement will cease. It is of course clear that these actions will occur when the unit is at any speed under the control of the governor. Hunting of the governor is therefore effectively checked and the speed may therefore be brought steadily and be held steadily at a predetermined value as selected by the proper control of motor 61. When the synchroscope S indicates that the generator 3 and line 5 are in synchronism and in phase and the volt meters indicate equality of voltages the operator may cause the closure of switch 4 thereby placing the generator and line in parallel. If the nut 33 has been so set that the generator will take a load when the governor is freed of the control of finger 55 a predetermined amount, the operator will reenergize motor 61 to cause the finger 55 to swing a predetermined amount further in a clockwise direction thereby permitting gate 8 to open further so that the generator may take a load. The operator then, of course, stops the motor 61. At this time the unit is in normal running condition and the governor parts are in such a position that the nut 27 is close to or rests upon the swivel nut 25 and the regulating valve 16 is in its neutral position.

If a larger load comes on the system 5, when the generator is operating as hereinabove described, the fly balls 31 will lower the floating pivot 30 thereby causing compression of spring 29 for the reason that the control finger 55 prevents the movement of the regulating valve to gate-open position. It is therefore evident that the setting of the control finger 55 limits the amount of power that the turbine is permitted to deliver and that the setting of this amount may be controlled at any desired distance from the turbine and governor.

It sometimes becomes desirable to cause a generating unit to deliver not more than a predetermined amount of power and also to prevent the governor from cutting back the amount of power delivered unless the load on the system which is being fed drops a predetermined substantial amount. This would, for example, be true if the system 5 was fed by steam-turbine-driven alternators and by the hydro-electric unit 1, 2. Usually a certain amount of water is avilable for the continuous production of power and it is not desired to exceed the resultant drain on the water supply and yet at the same time it is highly advantageous particularly for the party selling the water power that the amount of water used be at all times near the maximum permissible limit. This is also desirable from the viewpoint of the saving of coal, where, as stated, both steam and hydraulic units feed the same system. If the hydro-electric unit may be caused to maintain the amount of power delivered thereby when a predetermined load is removed from the system, thereby permitting that load to be taken off of the steam turbines rather than off of the hydraulic turbine, it is obvious that coal will be saved. This result may be brought about by operating the motor 48 in such a direction, under the control of reversing switch 51 and rheostat 50, that the gear 41 revolves in such a direction that the nut 33 will be raised by the screw threaded piston rod 34. With the control finger 55 and the floating pivot 30 remaining in the same position this will cause the swivel nut 25 to move away from the nut 27 thereby compressing spring 29. When the desired movement of the nut 33 has taken place the operator again stops motor 48. It will be evident that when the position of the parts has been thus changed, removal of a predetermined amount of load from system 5 will cause a predetermined rise in speed of the unit and the fly balls will therefore move outwardly thereby raising the floating pivot 30. The floating lever 26 will rotate about the pivot of nut 33 and the nut 25 will be raised a predetermined amount depending on what the rise in speed has been. It is furthermore evident that unless this speed rise has been enough to cause the nut 25 to come in contact with nut 27 to thereby lift the regulating valve stem to the gate-closed position, the turbine gate will not be moved toward closed position but will remain where it was before the hereinbefore described adjustment of nut 33. The turbine will therefore continue to supply the same amount of power to the system 5 as before the predetermined load had been removed from that system. Other units feeding the system are thereby relieved of that much load.

It should be understood that it is not desired to limit the invention to the exact details of description shown and described, for obvious modifications may occur to a person skilled in the art.

It is claimed and desired to secure by Letters Patent:

The method of starting from rest, bringing to synchronous speed with a distribution system, and causing a prime mover operatively connected to a generator to take a load, said prime mover being controlled by means including a gate for admitting operating fluid thereto, a motor for actuating said gate, means for controlling said motor, means responsive to the speed of said prime mover for governing said motor-controlling means, and means acting on said controlling means for preventing said gate from opening, which comprises moving said preventing means to gradually release said controlling means for movement toward gate-open position whereby said gate gradually opens under the control of said speed responsive means and said preventing means, continuing said movement until said prime mover reaches synchronous speed, connecting said generator to said distribution system when they are in phase, and then continuing said movement a predetermined desired amount to permit the generator to take a load.

In testimony whereof, the signature of the inventor is affixed hereto.

ARNOLD PFAU.